United States Patent [19]

Smith

[11] 4,440,138

[45] Apr. 3, 1984

[54] DIESEL ENGINE FUEL SYSTEM

[75] Inventor: Arthur W. Smith, Glastonbury, Conn.

[73] Assignee: Stanadyne, Inc., Windsor, Conn.

[21] Appl. No.: 349,060

[22] Filed: Feb. 16, 1982

[51] Int. Cl.³ .......................................... F02M 31/00
[52] U.S. Cl. .................................. 123/557; 123/514; 123/516
[58] Field of Search ............... 123/514, 516, 557, 552

[56] References Cited

U.S. PATENT DOCUMENTS

| | | | |
|---|---|---|---|
| 2,599,699 | 6/1952 | Dilworth | 123/516 |
| 4,303,051 | 12/1981 | Weishaar | 123/557 |
| 4,343,283 | 8/1982 | Shepherd | 123/514 |
| 4,377,149 | 3/1983 | Naylor | 123/516 |
| 4,380,987 | 4/1983 | Crain | 123/514 |
| 4,395,999 | 8/1983 | Crain | 123/557 |

FOREIGN PATENT DOCUMENTS 3017325 11/1980 Fed. Rep. of Germany ...... 123/514

*Primary Examiner*—Ronald H. Lazarus
*Attorney, Agent, or Firm*—McCormick, Paulding & Huber

[57] ABSTRACT

A diesel engine fuel system of the type which includes a fuel heater upstream of a filter in the fuel feed line from the tank to the engine injector and wherein a diverter line is connected at one end in the engine-to-tank return line and at its other end to the feed line downstream of the filter. A valve controls flow in the diverter line and is adapted to permit flow therein while substantially stopping return flow to the tank only when the heater is operating. The result is a dramatic improvement in heater efficacy.

5 Claims, 2 Drawing Figures

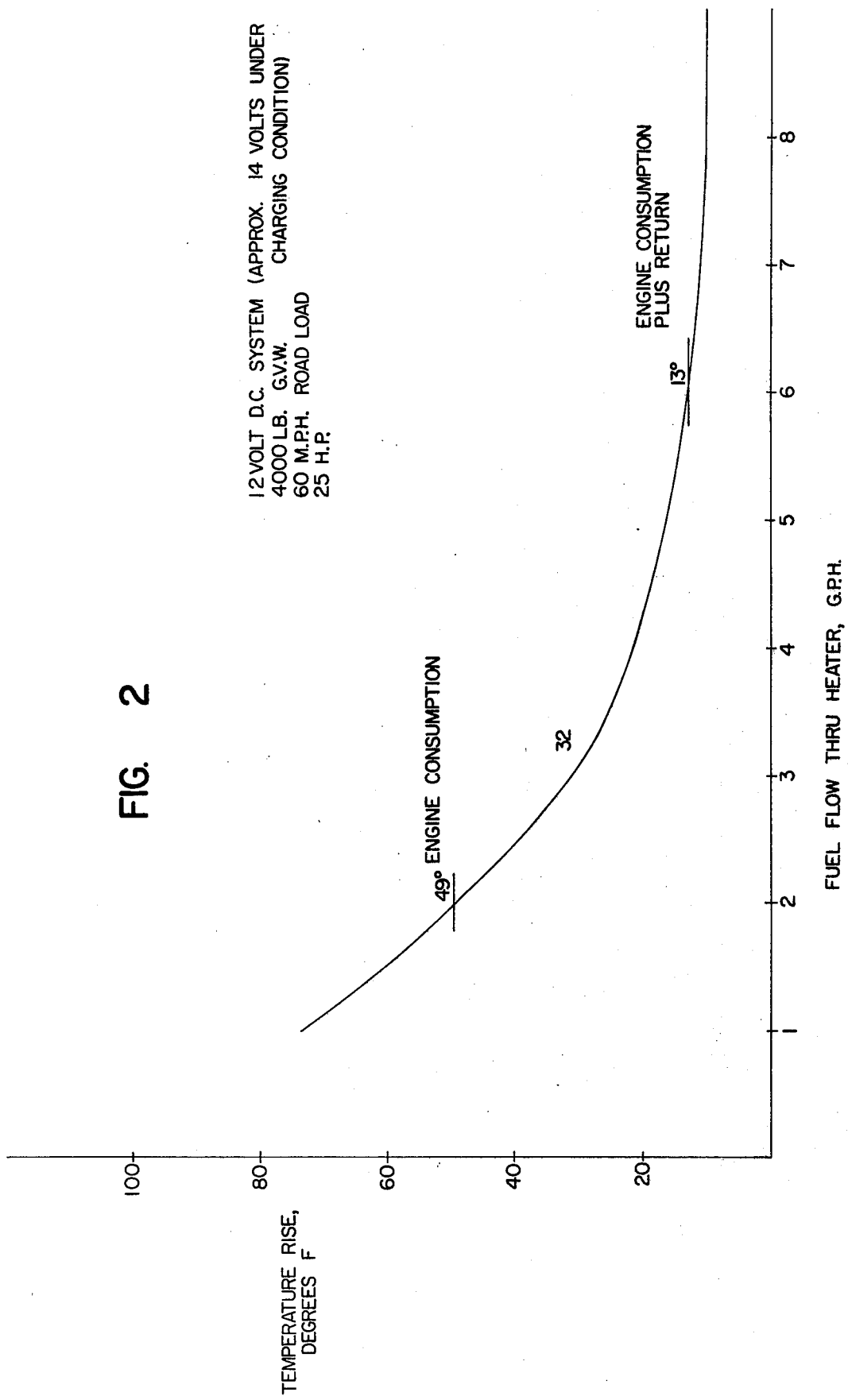

DIESEL ENGINE FUEL SYSTEM

BACKGROUND OF THE INVENTION

Diesel engines have long been recognized for their economic capabilities and are now widely accepted for automotive and other vehicle applications. Part of this acceptance has been achieved by the introduction of fuel heaters in the engine fuel systems to assure proper operation during cold weather conditions.

That is, diesel fuel contains a waxy constituent which precipitates out as small crystals when the fuel temperature drops below its "cloud point". Typically, this cloud point may be about 30° F. for some grades of diesel fuel. During cold weather operation, these wax crystals can gradually plug the fuel filter, cutting off delivery to the engine. Fuel heaters, such as the Master Fuel Heater Model A-10 manufactured by Stanadyne, Inc. can eliminate this fuel flow problem. As an in-line component of the fuel feed system, it is positioned upstream of the filter, and it is operated responsive to fuel temperature automatically to heat the fuel if the temperature thereof approaches or reaches the "cloud point".

It is the general object of the present invention to improve the efficacy of such heater by reducing the load thereon during its periods of operation.

SUMMARY OF THE INVENTION

The diesel engine fuel system provided in accordance with the present invention incorporates a fuel diverter line having one end connected in the engine-to-tank return line and with its other end connected in the feed line near the inlet to the engine injector pump and in any event downstream of the heater and downstream of the filter. A control valve is also incorporated in the system to divert a very substantial portion of the fuel in the return line through the diverter line while permitting a trickle of flow or at most a very limited flow through the return line back to the tank. This limited flow is desirable to purge air in the return line to the tank rather than to the engine injector. This control valve is adapted to be operated only when the heater is operated in response to temperature demand conditions.

As a result, flow through the heater during its operation is reduced substantially to the volume needed for engine consumption only. This, of course, increases the temperature level of the fuel flowing through the heater or allows the use of a lower wattage fuel heater reducing power drain on the vehicle electrical system. A permanent bypass through the diverter line to the engine injector is not desirable because the engine injector pump could possibly overheat at high ambient temperature.

BRIEF DESCRIPTION OF THE DRAWINGS

FIG. 2 is a graph which is provided to illustrate the enhanced heater efficacy achieved by the fuel system of this invention.

THE PREFERRED EMBODIMENT

Figure 1:
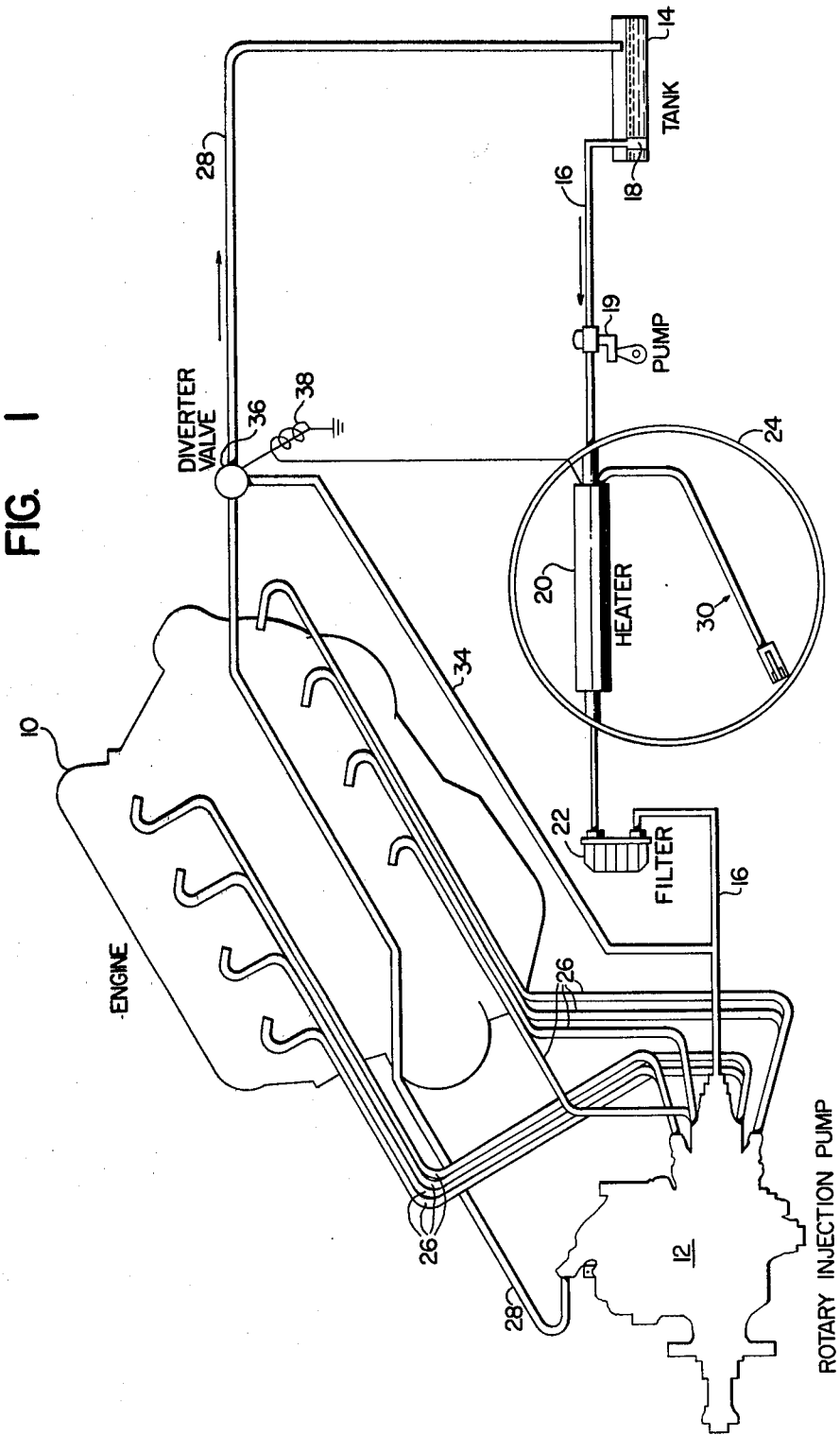
FIG. 1 is a schematic view of a diesel engine and its fuel system as provided in accordance with the present invention.

In FIG. 1 the outline of a conventional diesel engine is shown at 10, the outline of its rotary fuel injection pump is shown at 12, and the fuel tank or cell for the engine is indicated by the reference number 14. Fuel from the tank 14 is delivered to the engine injection pump 12 through a feed or delivery line 16 having a sediment filter 18 at its open end submerged in the body of diesel fuel in the tank.

The fuel is moved through the feed line 16 by a conventional lift-type fuel pump 19 and passes in the feed line 16 through a heater 20 and then a filter 22 before reaching the rotary injection pump 12. The delivery pump 19, is preferably engine driven in accordance with conventional practice, and the heater 20 and filter 22 are of conventional construction. For convenience of illustration, the heater 20 and all elements within the circle 24 are shown on enlarged scale, the circle 24 being merely a draftsman's circle and not an element of construction. For additional convenience in illustration and description all fuel passages are shown and referred to as "lines" but they may be tubes or passages bored into metal bodies in the actual construction.

As is well known in diesel engine operation, only a portion of the fuel reaching the injection pump 12 is utilized in firing the engine 10. The engine-consumed portion of the fuel flows through lines 26, 26 to injection nozzles for the engine cylinders, and the remaining fuel, which may be on the order of two to three times the volume of engine-consumed fuel is returned to the tank 14 through a return line designated generally by the reference numeral 28. The amount of fuel returned to the tank from the injection system depends on the engine demand as is dictated by the load placed on the engine.

What has thus far been described constitutes a conventional diesel engine fuel system including a heater for the purposes heretofore described. While other heaters may be employed, the preferred type heater is electrical, such as the Stanadyne Model A-10. While not a part of the present invention, it is to be understood that such electric heater has two primary functional components, the heater or heater element per se, and its electric power control. The control includes a high current capacity bimetal switch and a sensing element to sense the temperature of the fuel by thermal contact between the fluid carrying tube and the bimetal actuator. When a predetermined low temperature is sensed, a temperature in the vicinity of the "cloud point", the switch is closed to effect electrical communication from the vehicle voltage source (generator or battery) and the heater element. The wire lead and connector to the voltage source for the heater is indicated in FIG. 1 generally by the reference number 30. Thus, when low temperature conditions warrant, all of the fuel in the feed or delivery line 16, which includes fuel for engine consumption and the fuel which will ultimately be returned to the tank, is heated before flow to the filter so as to avoid the previously described waxy buildup at the filter and to avoid the possibility of fuel blockage.

As shown in FIG. 2, under cold weather operating conditions, a diesel driven vehicle wherein the gross vehicle weight is 4,000 pounds and the vehicle is being driven at 60 miles per hour at 25 horsepower, six gallons per hour of fuel may flow through the heater and be heated to avoid the waxy buildup before the fuel reaches the filter. As indicated by the graph line 32 in FIG. 2, studies have shown that the heater handling six gallons per hour may increase the temperature of the total flow by 13° F. That is, the total flow of fuel will be heated 13° above a level that could otherwise cause the waxy constituent of the fuel to precipitate out as small crystals.

In accordance with the present invention, a diverter line or passage 34 is incorporated in the system by being connected at one of its ends to the fuel return line 28 and at the other of its ends near the inlet to the rotary injection pump to the feed line 16. A valve 36 (the details of which form no part of the present invention) is placed at the connection between the fuel return line 28 and the diverter line 34 so as to control flow therein. The valve 36 is preferably operated by a solenoid 38 connected in the heater 20 control circuitry so as to be responsive to fuel temperature. That is, while other temperature responsive control means can be utilized for the valve 36, it is quite convenient to have the valve operated in synchronization with the heater element so as to permit flow through the diverter line 34 only while the heater is operating to heat the fuel. When the fuel temperature through the heater reaches a predetermined or preselected upper level and the heater shuts off, the valve 36 will be operated to prevent flow through the line 34. It is desirable that the valve 36 be constructed in accordance with conventional practice to permit some flow through the return line 28 to the tank 14 even while the very substantial portion of the return flow is diverted to the injection pump 12 inlet through the line 34. This permits any air in the return line to be vented at the tank 14 rather than to return with fuel to the injection pump and the engine.

It has been determined that under the load conditions set forth in connection with FIG. 2 that approximately two-thirds of the total fuel flow is returned to the tank and that only one-third or approximately two gallons per hour is used in engine operation. Therefore, when the valve 36 is operated with the heater to divert return fuel flow through the diverter line 34, only two gallons per hour must flow through the feed line 16 and the heater 20 for engine consumption and to meet the demand of the rotary injection pump 12. As a result, and as shown in FIG. 2 the heater 20 causes the two gallons per hour of fuel flowing through the line and heater to be elevated 49° F. Obviously, in accordance with the present invention, the efficacy of the heater 20 is dramatically enhanced.

Power drain on the vehicle electrical system is always a matter of concern. In keeping with this invention, the possibility is presented to substantially reduce the heater wattage level. Assuming the 13° F. heat rise currently obtained under total flow conditions to be adequate, the same temperature elevation across the engine for engine consumption flow could be obtained with a heater of approximately one-half the watt level required for total flow.

I claim:

1. In a diesel engine fuel system including a tank, an injector for introducing fuel to the engine and having a connection with a line for returning fuel to the tank, the system also including a delivery line from the tank to the injector wherein a temperature responsive fuel heater and a fuel filter are connected, the filter being downstream from the heater, the improvement comprising a diverter line connected to the return line and also connected to the delivery line downstream of the heater, and a valve controlling flow in the diverter line and the return line and operable to permit complete flow through the return line only when the said heater is not operating and to permit flow through the diverter line and simultaneous limited flow through the return line to the tank only when the heater is operating.

2. The system as set forth in claim 1 wherein the diverter line is connected to the delivery line downstream of the said filter.

3. The system defined in claim 1 or 2 wherein a pump is connected in the delivery line to cause flow from the tank to the injector.

4. The system as set forth in claim 1 wherein the injector comprises a rotary injection pump and the diverter line is connected to the delivery line between the said rotary injection pump and the fuel filter.

5. In a diesel engine fuel system including a tank, an injection system for introducing fuel to the engine and having a connection with a line for returning unused fuel to the tank; the system also including a delivery line from the tank to the injection pump wherein a pump, a temperature responsive fuel heater, and a fuel filter are connected in downstream flow order; the improvement comprising a diverter line connected to the return line and also connected to the delivery line downstream of the filter, and a flow control valve located at the return line and diverter line connection and adapted to permit complete flow through the return line while the heater is not operating and to permit flow through the diverter line only while the heater is operating and at the same time permitting limited flow through the return line to the tank.

* * * * *